(12) United States Patent
Burkard et al.

(10) Patent No.: US 8,732,569 B2
(45) Date of Patent: May 20, 2014

(54) PREDICTING USER NAVIGATION EVENTS

(75) Inventors: Timo Burkard, San Francisco, CA (US); Arvind Jain, Los Altos, CA (US)

(73) Assignee: Google Inc., Mountain View, CA (US)

( * ) Notice: Subject to any disclaimer, the term of this patent is extended or adjusted under 35 U.S.C. 154(b) by 164 days.

(21) Appl. No.: 13/100,615

(22) Filed: May 4, 2011

(65) Prior Publication Data

US 2012/0284597 A1    Nov. 8, 2012

(51) Int. Cl.
*G06F 3/033* (2013.01)

(52) U.S. Cl.
USPC ............................. 715/206; 715/205; 715/208

(58) Field of Classification Search
USPC .................................. 715/200, 205, 206, 208
See application file for complete search history.

(56) References Cited

U.S. PATENT DOCUMENTS

| | | | |
|---|---|---|---|
| 5,715,445 | A | 2/1998 | Wolfe |
| 5,946,682 | A | 8/1999 | Wolfe |
| 6,055,569 | A | 4/2000 | O'Brien et al. |
| 6,100,871 | A | 8/2000 | Min |
| 6,151,603 | A | 11/2000 | Wolfe |
| 6,182,133 | B1 | 1/2001 | Horvitz |
| 6,301,576 | B1 | 10/2001 | Wolfe |
| 6,604,103 | B1 | 8/2003 | Wolfe |
| 6,976,090 | B2 | 12/2005 | Ben-Shaul et al. |
| 7,047,502 | B2 | 5/2006 | Petropoulos et al. |
| 7,103,594 | B1 | 9/2006 | Wolfe |
| 7,277,924 | B1 | 10/2007 | Wichmann et al. |
| 7,428,701 | B1 | 9/2008 | Gavin et al. |
| 7,467,137 | B1 | 12/2008 | Wolfe |
| 7,480,669 | B2 | 1/2009 | Lo et al. |
| 7,487,147 | B2 | 2/2009 | Bates et al. |
| 7,536,635 | B2 | 5/2009 | Racovolis et al. |
| 7,613,712 | B2 | 11/2009 | Greenblatt et al. |
| 7,716,332 | B1 | 5/2010 | Topfl et al. |
| 7,747,749 | B1 | 6/2010 | Erikson et al. |
| 7,802,305 | B1 | 9/2010 | Leeds |
| 7,805,673 | B2 | 9/2010 | der Quaeler et al. |
| 7,840,589 | B1 | 11/2010 | Holt et al. |

(Continued)

FOREIGN PATENT DOCUMENTS

JP    2004536389 A    12/2004
KR    20070101237 A    10/2007

(Continued)

OTHER PUBLICATIONS

Christopher Schmitt, "CSS Cookbook, Third Edition," O'Reilly Media, Dec. 24, 2009, pp. 1, 33, 35 and 217-219.

(Continued)

*Primary Examiner* — Stephen Hong
*Assistant Examiner* — Gregory J Vaughn
(74) *Attorney, Agent, or Firm* — Lerner, David, Littenberg, Krumholz & Mentlik, LLP

(57) ABSTRACT

A method and system for predicting a next navigation event are described. Aspects of the disclosure minimize the delay between a navigation event and a network response by predicting the next navigation event. The system and method may then prerender content associated with the next navigation event. For example, the method and system may predict a likely next uniform resource locator during web browsing to preemptively request content from the network before the user selects the corresponding link on a web page. The methods describe a variety of manners of predicting the next navigation event, including examining individual and aggregate historical data, text entry prediction, and cursor input monitoring.

16 Claims, 13 Drawing Sheets

(56) References Cited

U.S. PATENT DOCUMENTS

| | | |
|---|---|---|
| 7,876,335 B1 | 1/2011 | Pittenger et al. |
| 7,908,336 B2 | 3/2011 | Carlson et al. |
| 8,112,308 B1 | 2/2012 | Ho et al. |
| 8,260,938 B2 | 9/2012 | Gupta et al. |
| 2002/0075333 A1 | 6/2002 | Dutta et al. |
| 2003/0050906 A1 | 3/2003 | Clifton-Bligh |
| 2003/0061451 A1 | 3/2003 | Beyda |
| 2003/0088580 A1 | 5/2003 | Desai et al. |
| 2003/0212760 A1 | 11/2003 | Chen et al. |
| 2004/0267600 A1 | 12/2004 | Horvitz |
| 2004/0268228 A1* | 12/2004 | Croney et al. ............ 715/505 |
| 2005/0132296 A1* | 6/2005 | Milic-Frayling et al. ..... 715/745 |
| 2005/0240576 A1 | 10/2005 | Piscitello et al. |
| 2005/0251396 A1 | 11/2005 | Tyler |
| 2006/0047804 A1* | 3/2006 | Fredricksen et al. ......... 709/224 |
| 2006/0143568 A1 | 6/2006 | Milener et al. |
| 2006/0282771 A1 | 12/2006 | Vinci |
| 2007/0005425 A1* | 1/2007 | Bennett et al. ................ 705/14 |
| 2007/0198634 A1 | 8/2007 | Knowles et al. |
| 2007/0208704 A1 | 9/2007 | Ives |
| 2007/0220010 A1 | 9/2007 | Ertugrul |
| 2007/0226633 A1 | 9/2007 | Lyle et al. |
| 2007/0288648 A1 | 12/2007 | Mehanna et al. |
| 2008/0052219 A1* | 2/2008 | Sandholm et al. .............. 705/37 |
| 2008/0104407 A1 | 5/2008 | Horne et al. |
| 2008/0201332 A1 | 8/2008 | Souders et al. |
| 2008/0208789 A1 | 8/2008 | Almog |
| 2008/0249969 A1 | 10/2008 | Tsui et al. |
| 2008/0256134 A1 | 10/2008 | Bogner et al. |
| 2008/0295006 A1 | 11/2008 | LuVogt et al. |
| 2009/0013006 A1* | 1/2009 | Friedl et al. ................... 707/200 |
| 2009/0070392 A1 | 3/2009 | Le Roy et al. |
| 2009/0094196 A1 | 4/2009 | Piwowarski et al. |
| 2009/0132949 A1 | 5/2009 | Bosarge |
| 2009/0158221 A1 | 6/2009 | Nielsen et al. |
| 2009/0171930 A1 | 7/2009 | Vaughan et al. |
| 2009/0216639 A1 | 8/2009 | Kapczynski et al. |
| 2009/0265774 A1 | 10/2009 | Malik et al. |
| 2009/0327424 A1 | 12/2009 | Bernstein et al. |
| 2010/0005061 A1 | 1/2010 | Basco et al. |
| 2010/0023581 A1 | 1/2010 | Lahav |
| 2010/0031366 A1* | 2/2010 | Knight et al. ................... 726/26 |
| 2010/0107115 A1 | 4/2010 | Sareen et al. |
| 2010/0131902 A1 | 5/2010 | Teran et al. |
| 2010/0191856 A1 | 7/2010 | Gupta et al. |
| 2010/0251116 A1 | 9/2010 | Rimas-Ribikauskas et al. |
| 2010/0306665 A1 | 12/2010 | Milic-Frayling et al. |
| 2011/0029518 A1 | 2/2011 | Tong |
| 2011/0029670 A1 | 2/2011 | Klein et al. |
| 2011/0119361 A1 | 5/2011 | Issa et al. |
| 2011/0173569 A1 | 7/2011 | Howes et al. |
| 2011/0199304 A1* | 8/2011 | Walley et al. ................. 345/158 |
| 2011/0225494 A1 | 9/2011 | Shmuylovich et al. |
| 2011/0289317 A1* | 11/2011 | Darapu et al. ................ 713/168 |
| 2012/0017146 A1 | 1/2012 | Travieso et al. |
| 2012/0084644 A1 | 4/2012 | Robert et al. |
| 2012/0254721 A1 | 10/2012 | Jain et al. |
| 2012/0324043 A1 | 12/2012 | Burkard et al. |

FOREIGN PATENT DOCUMENTS

| | | |
|---|---|---|
| KR | 20080111822 | 12/2008 |
| KR | 20100102858 A | 9/2010 |
| KR | 20100112512 | 10/2010 |

OTHER PUBLICATIONS

U.S. Appl. No. 13/353,626, filed Jan. 19, 2012.
International Search Report dated Nov. 28, 2012, in International Application No. PCT/US2012/036519.
International Search Report and Written Opinion dated Dec. 14, 2012 for PCT application US2012044896.
International Search Report and Written Opinion for Application No. PCT/US2012/042186 dated Feb. 20, 2013.
International Search Report and Written Opinion for Application No. PCT/US2012/055473 dated Feb. 26, 2013.
StackOverflow.com, "Detect if Browser Tab Has Focus," Sep. 2011, 2 pages.
International Search Report & Written Opinion dated May 7, 2013 for Application No. PCT/US2013/021927.

* cited by examiner

PREDICTING USER NAVIGATION EVENTS

BACKGROUND

The advent of the World Wide Web has placed more information at the fingertips of today's users than ever before. Various websites cater to nearly every need and interest, providing access to reference information, business and financial documents, social networking, and more. Widespread broadband Internet access provides faster access to these sites than ever before.

However, as fast as current high-speed Internet services are, the act of browsing the web is not instantaneous. When a user selects a link on a page or enters a uniform resource locator (URL) in a text field, there is a delay while data is requested from the host, sent to the client, and rendered in the browser. The user is typically idle while waiting for their requested site to load. While high-speed Internet access may limit this delay to a few seconds, even this short delay can add up to thousands of man-hours of lost productivity each year.

BRIEF SUMMARY

A method and system for predicting user navigation events are described. Aspects of the disclosure minimize the delay in accessing web content by predicting a user navigation event on a web page. The navigation event may be predicted by various indicators, including but not limited to a user's navigation history, aggregate navigation history, text entry within a data entry field, or a mouse cursor position. Users can be provided with an opportunity to op in/out of functionality that may collect personal information about users. In addition, certain data can be anonymized and aggregated before it is stored or used, such that personally identifiable information is removed.

In one aspect, the disclosure describes a computer-implemented method for predicting a navigation event. The method comprises receiving an indicator of navigational intent, predicting, using a processor, a next navigation event from the indicator, and prerendering content associated with the next navigation event. The next navigation event is a uniform resource locator, and the indicator is at least one of a browsing history, a text entry, or a cursor input.

In another aspect, the disclosure describes a computer-implemented method for predicting a navigation event. The method comprises tracking a navigation history calculating one or more confidence values for one or more of a plurality of navigation events using the navigation history, determining, using a processor, one or more likely navigation events using the confidence values, and identifying at least one of the one or more likely navigation events as a predicted navigation event. The method may further include retrieving content associated with the predicted navigation event. In some aspects, the stage of calculating the one or more confidence values comprises monitoring for the selection of a first uniform resource locator, incrementing, in response to the selection, a frequency value associated with the first uniform resource locator or a frequency value associated with a pair of uniform resource locators, storing the frequency value in a memory, and determining a confidence value for the uniform resource locator or pair of uniform resource locators from at least one frequency value stored in the memory. The pair of uniform resource locators may comprise the first uniform resource locator and a source uniform resource locator.

In another aspect, the method comprises decaying a frequency value for non-selected uniform resource locators after a predetermined time interval. The decaying of the frequency value for the non-selected uniform resource locators may be performed in response to the selection of the first uniform resource locator. In yet another aspect, the navigation history is associated with at least one of a particular client or a particular user. In a yet further aspect, the navigation history is associated with a plurality of users.

In another aspect, the method may further comprise computing a first hash value for a navigation event associated with a first uniform resource locator or a transitional pair of uniform resource locators, computing a confidence value for the navigation event, and transmitting the hash value and the confidence value, such that a receiver of the first hash value and the confidence value computes a second hash value of a second uniform resource locator to identify the first uniform resource locator to which the confidence value applies. The transitional pair may comprise a source uniform resource locator and a destination uniform resource locator. In some aspects of the method, the stage of determining the most likely navigation event comprises computing, for at least one uniform resource locator (URL), a most visited subsequent URL based on the navigation history of the plurality of users. In another aspect, the method further comprises determining if the number of visits to the subsequent uniform resource locator is greater than a threshold number of visits.

In another aspect, the method may further comprise determining if a number of users submitting data for the subsequent uniform resource locator is greater than a threshold number of users. Another aspect of the method further includes identifying a window of recent visits to be analyzed to determine the most visited subsequent URL, and analyzing visits within the identified window. In some aspects, the window is specified by a time period or a number of visits.

In further aspects of the method, the navigation history comprises at least one of a uniform resource locator or a transitional pair of uniform resource locators. The transitional pair of uniform resource locators comprises a source uniform resource locator and a destination uniform resource locator.

In further aspects, the disclosure describes a method of predicting a next navigation event. The method comprises receiving a set of data for a uniform resource locator, computing, using a processor, a hash value for one or more links present on a page associated with the uniform resource locator, comparing the computed hash values with the received hash values to map each computed hash value to a received hash value, and identifying a confidence value associated with each visible link based upon the received confidence value associated with the received hash value to which the computed hash value for the link maps. The set of data comprises hash values associated with one or more links associated with the uniform resource locator and a set of confidence values associated with the one or more links. In another aspect, the method further comprises predicting one or more next navigation events, where the one or more predicted next navigation events relate to a link with the highest identified confidence value.

Yet further aspects of the disclosure describe a method for predicting a next navigation event. The method includes monitoring text entry within a text entry field, predicting, using a processor, a likely uniform resource locator or likely query based upon the text entry, and identifying the likely uniform resource locator or likely query as a predicted next navigation event. In some aspects, predicting the likely URL includes comparing the text entry with a user history to identify a previously visited uniform resource locator. Predicting the likely query may also comprise comparing the text entry with a set of previously entered search queries to identify a likely next query as the next navigation event. In some aspects, the method further includes identifying a set of search results associated with the identified likely next query. In yet further aspects, the method may include identifying a most relevant search result from the set of search results as the predicted next navigation event. The stage of predicting the likely query may include receiving a set of possible queries from a search engine based upon the text entry.

In further aspects, the disclosure may comprise a computer-implemented method for predicting a next navigation event. The method comprises monitoring movement of a cursor within a browser, and predicting, using a processor, a next navigation event by identifying at least one of a hyperlink toward which the cursor is moving or a hyperlink on which the cursor is located. The browser displays a web page with one or more hyperlinks. Additional aspects of the method further include prerendering a web page associated with the identified hyperlink. Aspects of the method may further include extrapolating the movement of the cursor to identify a line, and identifying one or more of the hyperlinks on the identified line as the next navigation event. In some aspects, the method further includes calculating a speed of the cursor and a distance to each of the hyperlinks to determine to which of the hyperlinks the cursor is likely to be traveling.

In another aspect, the disclosure provides a processing system for predicting a next navigation event. The processing system comprises at least one processor, a navigation prediction module associated with the at least one processor, and memory for storing navigation data. The memory is coupled to the at least one processor. the navigation prediction module is configured to calculate one or more confidence values for one or more of a plurality of navigation events using the navigation data, to determine one or more likely navigation events using the confidence values, and to identify at least one of the one or more likely navigation events as a predicted navigation event.

DETAILED DESCRIPTION

Embodiments of a system and method for predicting user navigation events are described herein. Aspects of this disclosure minimize the delay between a navigation event and a network response by predicting the next navigation event. The system and method may prerender content associated with the next navigation event. For example, the method and system may predict a likely next uniform resource locator during web browsing to preemptively request content from the network before the user selects the corresponding link, thus reducing or eliminating the wait time when a user selects a hyperlink on a web page. Various methods describing a variety of manners of predicting the next navigation event, including examining individual and aggregate historical data, text entry prediction, and cursor input monitoring are described. Aspects of the disclosure relate to the prediction of the immediate user navigation (e.g. the next link the user is likely to select when viewing a particular web page, such as within the next 30 seconds, the next minute, or the next 5 minutes).

Figure 1:
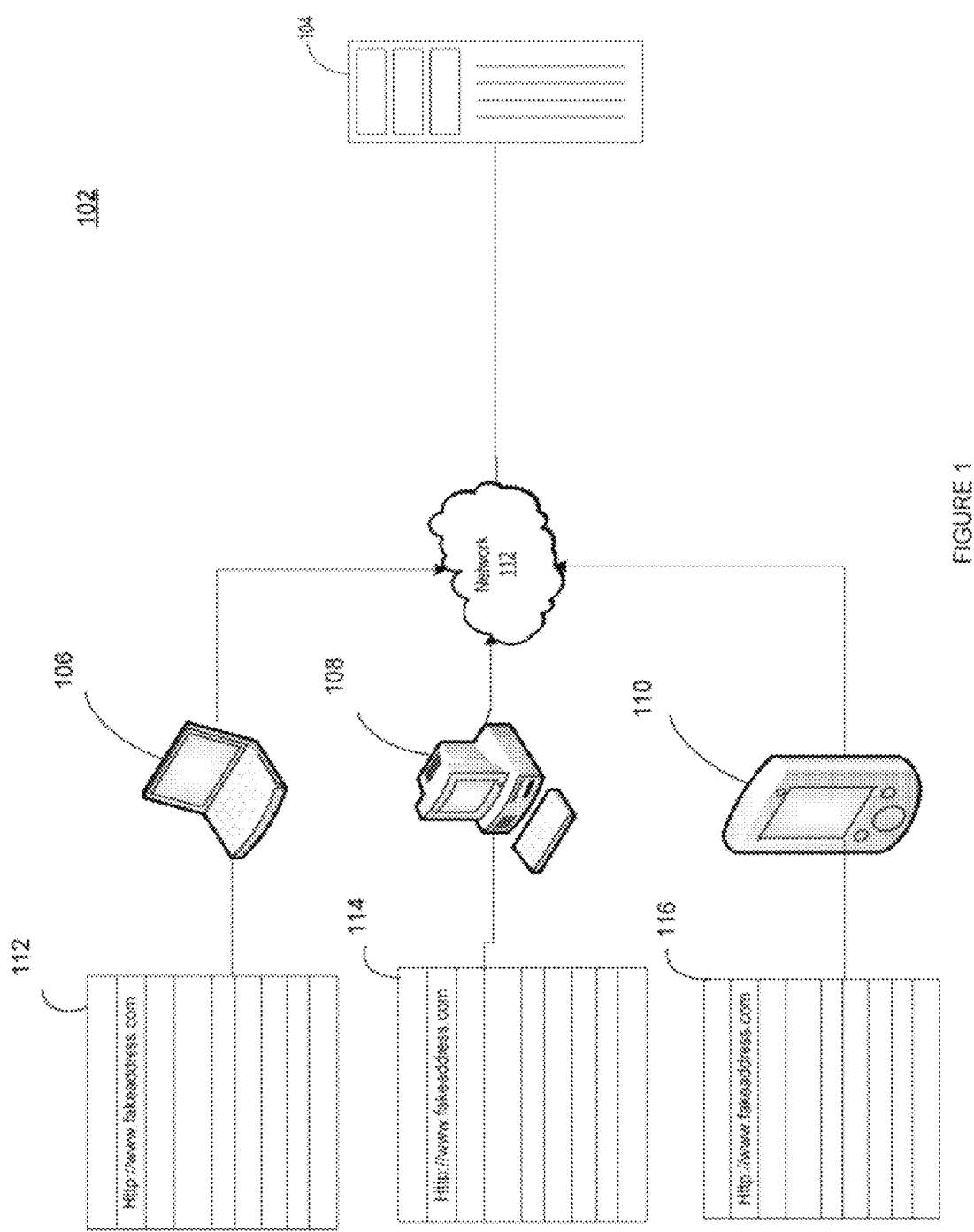
FIG. 1 is a system diagram depicting an example of a server in communication with example client devices in accordance with aspects of the disclosure.

As shown in FIG. 1, an example system 100 in accordance with one embodiment includes a server 104 in communication (via a network 112) with one or more client devices 106, 108, 110 displaying web browser interfaces 114, 116, 118.

The client devices 106, 108, 110 are operable to perform prerendering operations during the execution of a web browser application. The server 104 may transmit navigation history data to the client devices 106, 108, 110, to enable prediction of a next navigation event. In some aspects, the client devices 106, 108, 110 determine a next navigation event using a local navigation history and generate a web request to the server 104 to prerender the content associated with the next navigation event. For example, the user of the client device 106 may browse to a web page located at "www.fakeaddress.com" as displayed on the web browser interface 112. That page includes content selectable by the user. Based on the user's navigation history, the client device 106 may determine which of the selectable content the user is likely to select, and then prerender the content associated with the selectable content by requesting the content from the server 104.

As another example, the client device 108 may display www.fakeaddress.com within a browser 114. The client device 108 may receive an aggregate set of navigation statistics from the server 104, and then determine which selectable content the user is likely to select based upon the aggregate set of navigation statistics. As yet another example, the client device 110 may display www.fakeaddress.com within a browser 116. The client device 108 may determine which selectable content the user is likely to select based upon a cursor position within the browser 114.

While the concepts described herein are generally discussed with respect to a web browser, aspects of the disclosure can be applied to any computing node capable of managing navigation events over a network, including a server 104.

The client devices 106, 108, 110 may be any device capable managing data requests via a network 112. Examples of such client devices include a personal computer (PC) 108, a mobile device 110, or a server 104. The client devices 106, 108, 110 may also comprise personal computers, personal digital assistants ("PDA"): tablet PCs, netbooks, etc. Indeed, client devices in accordance with the systems and methods described herein may comprise any device operative to process instructions and transmit data to and from humans and other computers including general purpose computers, network computers lacking local storage capability, etc.

The client devices 106, 108, 110 are operable to predict navigation events to assist in data access on the network 112. For example, the client devices may predict a likely navigation event to facilitate prerendering of a web page in order to improve the user's browsing experience. In some aspects, the server 104 provides navigation data that may be used by the client devices 106, 108, 110 to predict a likely navigation event (See FIGS. 6-8). In some aspects, the client devices 106, 108, 110 predict a likely navigation event using local data. (See FIGS. 3-5, 9-10).

The network 112, and the intervening nodes between the server 104 and the client devices 106, 108, 110, may comprise various configurations and use various protocols including the Internet, World Wide Web, intranets, virtual private networks, local Ethernet networks, private networks using communication protocols proprietary to one or more companies, cellular and wireless networks (e.g., Wi-Fi), instant messaging, hypertext transfer protocol ("HTTP") and simple mail transfer protocol ("SMTP"), and various combinations of the foregoing. It should be appreciated that a typical system may include a large number of connected computers.

Although certain advantages are obtained when information is transmitted or received as noted above, other aspects of the system and method are not limited to any particular manner of transmission of information. For example, in some aspects, information may be sent via a medium such as an optical disk or portable drive. In other aspects, the information may be transmitted in a non-electronic format and manually entered into the system.

Although some functions are indicated as taking place on the server 104 and other functions are indicated as taking place on the client devices 106, 108, 110, various aspects of the system and method may be implemented by a single computer having a single processor. It should be appreciated that aspects of the system and method described with respect to the client may be implemented on the server, and vice-versa.

Figure 2:
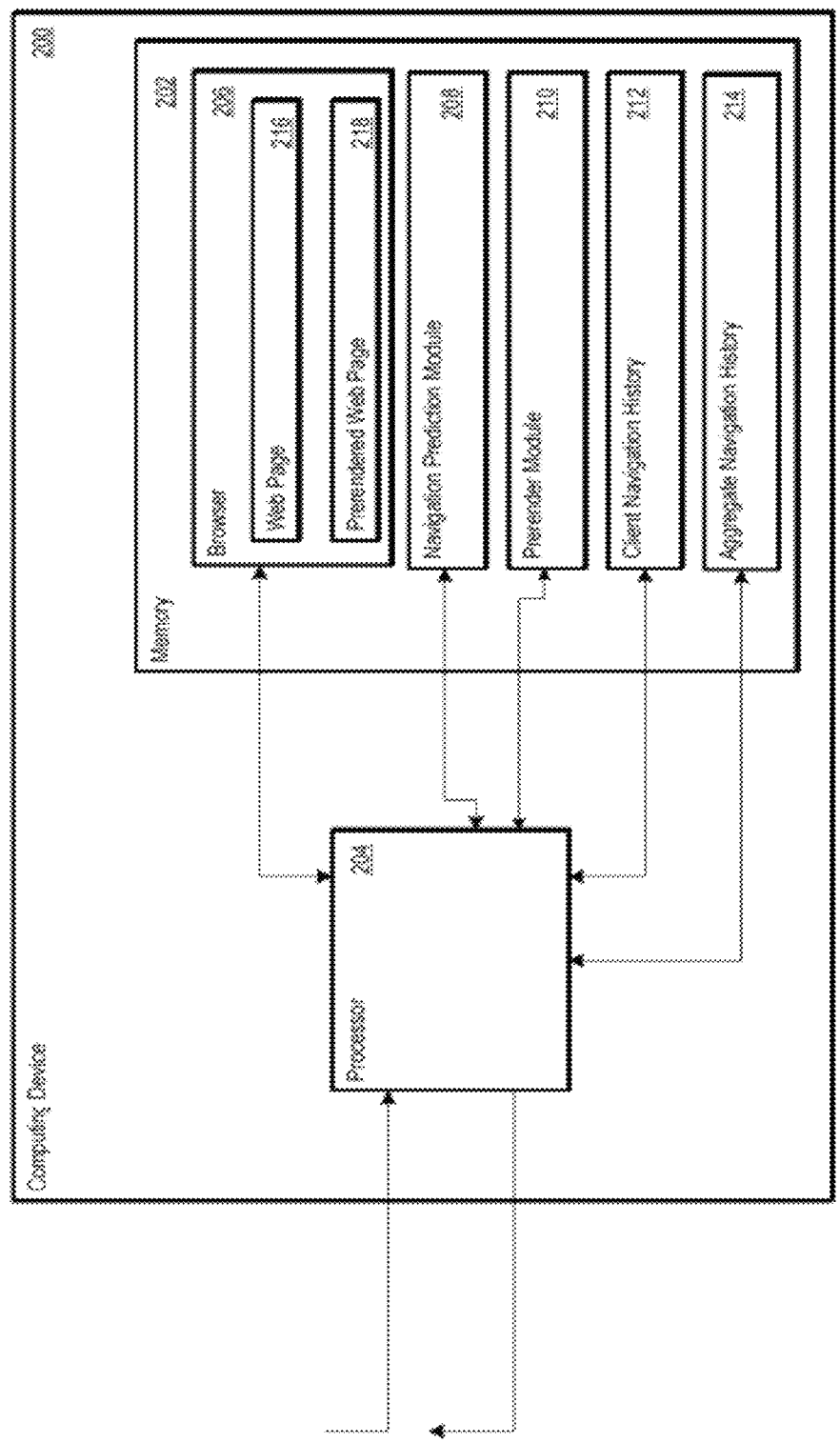
FIG. 2 is block diagram depicting an example computing device in accordance with aspects of the disclosure.

FIG. 2 is a block diagram depicting an example of a computing device 200, such as one of the client devices 106, 108, 110 described with respect to FIG. 1. The computing device 200 may include a processor 204, a memory 202 and other components typically present in general purpose computers. The memory 202 may store instructions and data that are accessible by the processor 204. The processor 204 may execute the instructions and access the data to control the operations of the computing device 200.

The memory 202 may be any type of memory operative to store information accessible by the processor 120, including a computer-readable medium, or other medium that stores data that may be read with the aid of an electronic device, such as a hard-drive, memory card, read-only memory ("ROM"), random access memory ("RAM"), digital versatile disc ("DVD") or other optical disks, as well as other write-capable and read-only memories. The system and method may include different combinations of the foregoing, whereby different portions of the instructions and data are stored on different types of media.

The instructions may be any set of instructions to be executed directly (such as machine code) or indirectly (such as scripts) by the processor 204. For example, the instructions may be stored as computer code on a computer-readable medium. In that regard, the terms "instructions" and "programs" may be used interchangeably herein. The instructions may be stored in object code format for direct processing by the processor 204, or in any other computer language including scripts or collections of independent source code modules that are interpreted on demand or compiled in advance. Functions, methods and routines of the instructions are explained in more detail below (See FIGS. 3-10).

Data may be retrieved, stored or modified by processor in accordance with the instructions. For instance, although the architecture is not limited by any particular data structure, the data may be stored in computer registers, in a relational database as a table having a plurality of different fields and records, Extensible Markup Language ("XML") documents or flat files. The data may also be formatted in any computer readable format such as, but not limited to, binary values or Unicode. By further way of example only, image data may be stored as bitmaps comprised of grids of pixels that are stored in accordance with formats that are compressed or uncompressed, lossless (e.g., BMP) or lossy (e.g., JPEG), and bitmap or vector-based (e.g., SVG), as well as computer instructions for drawing graphics. The data may comprise any information sufficient to identify the relevant information, such as numbers, descriptive text, proprietary codes, references to data stored in other areas of the same memory or different memories (including other network locations) or information that is used by a function to calculate the relevant data.

The processor 204 may be any suitable processor, such as various commercially available general purpose processors. Alternatively, the processor may be a dedicated controller such as an application-specific integrated circuit ("ASIC").

Although FIG. 2 functionally illustrates the processor and memory as being within a single block, it should be understood that the processor 204 and memory 202 may comprise multiple processors and memories that may or may not be stored within the same physical housing. Accordingly, references to a processor, computer or memory will be understood to include references to a collection of processors, computers or memories that may or may not operate in parallel.

The computing device 200 may be at one node of a network and be operative to directly and indirectly communicate with other nodes of the network. For example, the computing device 200 may comprise a web server that is operative to communicate with client devices via the network such that the computing device 200 uses the network to transmit and display information to a user on a display of the client device.

In some examples, the system provides privacy protections for the client data including, for example, anonymization of personally identifiable information, aggregation of data, filtering of sensitive information, encryption, hashing or filtering of sensitive information to remove personal attributes, time limitations on storage of information, and/or limitations on data use or sharing. Data can be anonymized and aggregated such that individual client data is not revealed.

In order to facilitate the navigation event prediction operations of the computing device 200, the memory 202 may further comprise a browser 206, a navigation prediction module 208, a prerender module 210, a client navigation history 212, and an aggregate navigation history 214. Although a number of discrete modules (e.g., 206, 208, 210, 212 and 214) are identified in connection with FIG. 2, the functionality of these modules can overlap and/or exist in a fewer or greater number of modules than what is shown, with such modules residing at one or more processing devices, which may be geographically dispersed. The browser 206 provides for the display of a web page 216 to a user of the client device by sending and receiving data across a computer network. The web page 216 may be received in response to a network request, such as a Hypertext Transfer Protocol (HTTP) GET request. The web page 216 may be provided in a markup language, such as Hypertext Markup Language (HTML). The web page 216 may also include various scripts, data, forms, and the like, including interactive and executable content such as ADOBE FLASH content, JAVASCRIPT content, and the like.

The browser 206 may further comprise a prerendered web page 218. The prerendered web page 218 represents a web page that was requested and accessed by the prerender module 210 in response to a predicted navigation event provided by the navigation prediction module 208. In the event the user inputs a navigation event as predicted by the prediction module 208, the browser 206 may swap the prerendered web page 218 with the web page 216, thus providing the content associated with the navigation event without the need to send another network request. In some aspects, the swap may occur before the prerendered web page 218 has finished loading. In such cases, the partially loaded prerendered web page 218 may be swapped in to continue loading as the active page.

The memory 202 may further comprise a prerender module 210 to perform fetching of a next web page as identified by the navigation prediction module 208. The prerender module 210 sends a network request for the web page identified to be the likely next navigation destination that the user will select. The web page received in response to this request is then stored in the browser 206 as the prerendered web page 218. In some aspects, the web page request generated by the prerender module 210 is identical to a standard web page request. In some aspects, the web page request generated by the prerender module 210 comprises certain features to facilitate the prerender process.

The memory 202 may also store a client navigation history 212 and an aggregate navigation history 214. The client navigation history 212 comprises a set of navigation events associated with past activity of the browser 206. The client navigation history 212 may track a set of visited URLs, also known as a "clickstream," which tracks an order in which the user typically visits URLs (e.g. when the user visits a news website, they tend to next select a URL corresponding to the top story of the day), a set of access times associated with the URLs, and the like. In some aspects, the client navigation history 212 comprises a set of URLs and a frequency with which the user has visited each URL. In some aspects, the client navigation history comprises a set of URL pairs, representing a source URL and a destination URL. The aggregate navigation history 214 may comprise similar data as the client navigation history 212, but keyed to multiple users rather than a single user. As with the client navigation history 212, the aggregate navigation history 214 may be stored as a set of URLs and a frequency for each, or a set of URL pairs representing a transition from a source URL to a destination URL.

The client navigation history 212 and aggregate navigation history 214 may represent data collected using one or more browser add-ons, scripts, or toolbars. In some aspects, the client navigation history 212 and/or aggregate navigation history 214 are maintained on a remote server, such as the server 104, and provided to the computing device 200. The computing device 200 may maintain separate records to facilitate the predicting of a next likely navigation event, or it may act in concert with remotely stored data. In some aspects, only aggregate navigation history 214 pertaining to the particular web page the user is currently viewing is provided to the computing device 200 (See FIGS. 6 and 8).

As described above, the aggregate navigation history data 214 can be maintained in an anonymous fashion, with privacy protections for the individual client data that comprises the aggregate navigation history, including, for example, anonymization of personally identifiable information, aggregation of data, filtering of sensitive information, encryption, hashing or filtering of sensitive information to remove personal attributes, time limitations on storage of information, and/or limitations on data use or sharing. The aggregate navigation history 214 data can be anonymized and aggregated such that individual client data is not revealed.

Figure 3:
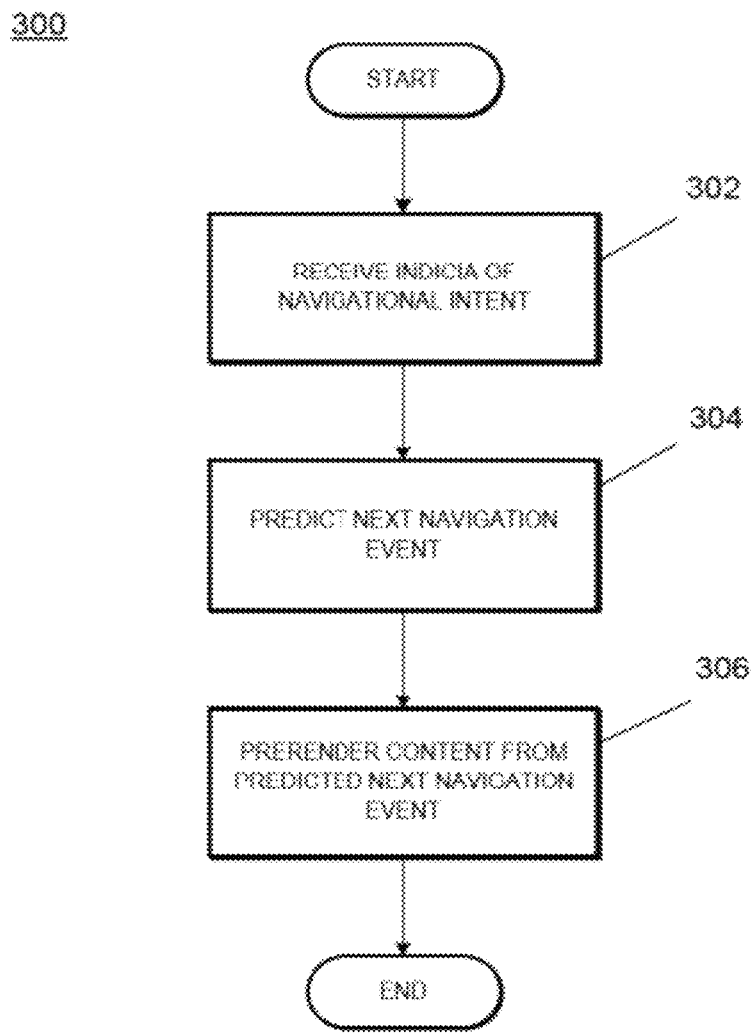
FIG. 3 is a flow diagram depicting an example method for prerendering a web page based upon a predicted navigation event in accordance with aspects of the disclosure.

FIG. 3 is a flow diagram depicting an example method 300 for prerendering a web page based upon a predicted navigation event in accordance with aspects of the disclosure. Aspects of the method 300 operate to identify one or more likely navigation destinations from a set of navigation indicators, and then prerender the identified navigation destinations. The method 300 may be performed by a computing device, such as the computing device 200, to eliminate delays in the user web browsing experience by prerendering web pages that are identified as likely navigation targets by the user. For example, the method 300 may be performed by elements of the browser 206, the navigation prediction module 208, and the prerender module 210 acting together. While aspects of the method 300 are described with respect to the computing device 200, the method 300 may also be performed by the server 104, or any device with hardware and/or software designed to accept instructions.

At stage 302, the computing device 200 receives one or more indicators of navigational intent. Navigational intent may be any action that would tend to indicate that the user will generate a particular network request, such as a request for a particular web page. For example, the indicators may provide metrics by which to determine what the particular request will be, such as a confidence value. For example, the user may navigate to a certain web page, from which they generally navigate to another certain web page based upon their browsing history, or the user may move his mouse cursor towards a particular hyperlink embedded within a web page. In some aspects, the indicator is received from a remote server, such as a search engine that embeds an indicator within search results, indicating that most users that submit a particular search query select a particular search result.

At stage 304, after receiving the indicator of navigational intent, the computing device 200 attempts to predict the most likely navigation event. In short, the computing device 200 makes a best guess of to where the user is likely to navigate next, based upon the indicator. Methods of performing this prediction are described below. (See FIGS. 4-10).

At stage 306, the computing device 200 prerenders the content from the predicted next navigation event as determined at stage 304. The prerendering process may include storing a prerendered web page within a browser, such as the prerendered web page 218. The computing device 200 may prerender a single web page predicted as the most likely navigation event, or the computing device 200 may prerender multiple pages. In some aspects, the computing device 200 determines the number of pages to prerender based upon one or more system capabilities of the computing device 200, such as available system resources, available network bandwidth, processor speed, installed memory, and the like. In some aspects, the number of pages to prerender may be configurable in one or more user settings. After prerendering the content associated with the navigation event(s), the method 300 ends.

Multiple methods for predicting a next navigation event are provided below. While each method is described separately, it should be appreciated that aspects of the methods may be combined to improve navigation prediction operations.

Figure 4:
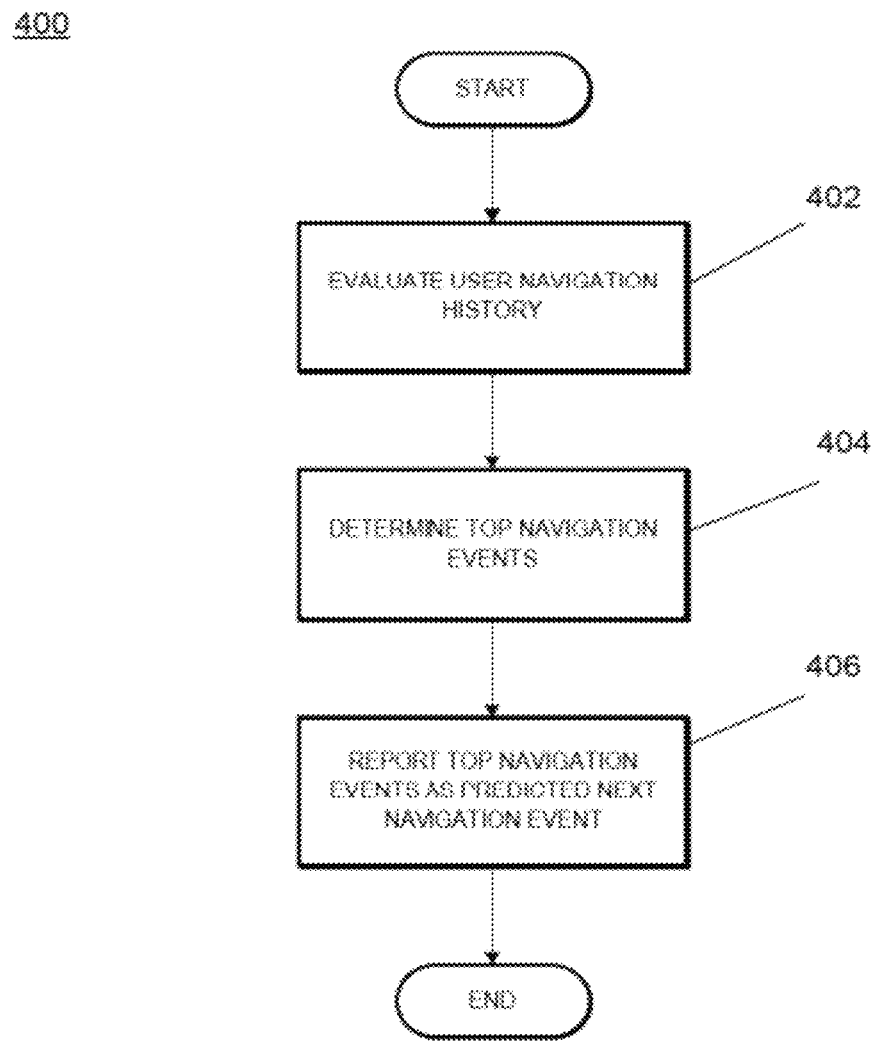
FIG. 4 is a flow diagram depicting an example method for predicting a navigation event based on a client navigation history in accordance with aspects of the disclosure.

FIG. 4 is a flow diagram depicting an example method 400 for predicting a navigation event based on a client navigation history in accordance with aspects of the disclosure. The method 400 provides for storing a navigation history for a user, and predicting a next navigation event based upon a navigation history of a particular user. As above, the method 400 may be performed by a computing device such as the computing device 200. In particular, the method 400 may be performed by a navigation prediction module executing on a processor, such as the navigation prediction module 208.

At stage 402, the computing device 200 tracks a user navigation history. For example, the computing device 200 may store records of web pages visited by the user, such as the browsing history commonly maintained in web browsers. The browsing history may comprise the URLs of the web pages visited by the user, the order in which the URLs were visited, and the manner in which the user selected the URL (e.g. whether the URL was a clicked hyperlink, typed into an address bar, a redirect operation from another web page, etc.).

At stage 404, the computing device 200 determines a most likely navigation event or events based upon the user navigation history. The most likely navigation events may be determined by identifying the globally most visited pages for the user, or the navigation events may be associated with one or more current criteria. For example, the computing device 200 may examine the user's navigation history to determine that, when the user is viewing a particular news web page, they almost always select a link to the top news story on that page, or that when the user first opens the browser in the morning, they are likely to navigate to their bank account page to check their daily balance. The computing device 200 may employ various rules, heuristics, and filters to determine the most likely navigation event from the user history. The computing device 200 may associate each navigation event with a particular confidence value, indicating the likelihood that the user will select each navigation event. These confidence values may then be used to sort the navigation events to determine the most likely navigation event. A method to determine a confidence value for a given navigation event is described further below (See FIG. 5).

At stage 406, the computing device 200 reports the most likely navigation event as the predicted navigation event. For example, these predicted most likely navigation event may then be employed by the method described above (See FIG. 3) to facilitate prerendering of the web pages associated with the most likely navigation event.

Figure 5:
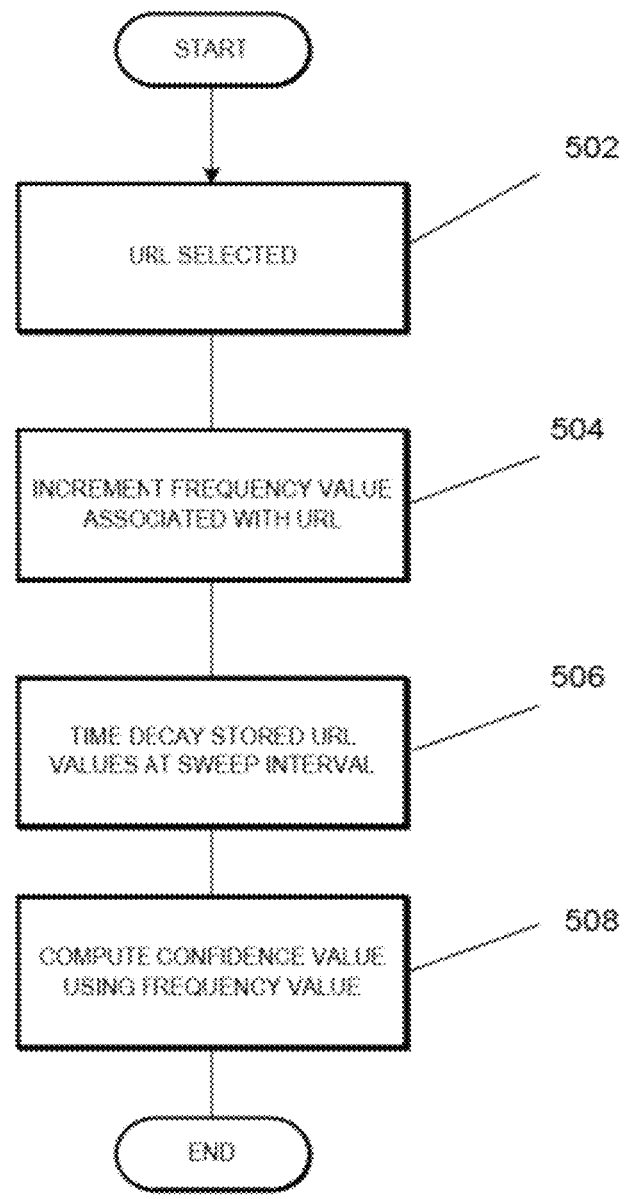
FIG. 5 is a flow diagram depicting an example method for computing a confidence value for a URL using a client navigation history in accordance with aspects of the disclosure.

FIG. 5 is a flow diagram depicting an example method 500 for computing a confidence value for a URL using a user navigation history in accordance with aspects of the disclosure. The method 500 is operable to track navigation events input by the user and to maintain a frequency value for each stored event. The method 500 may be employed to build a client navigation history as used by the method 400, and stored on the computing device 200 as the client navigation history 212.

At stage 502, the computing device 200 tracks the selection of a particular URL. For example, the user may type a URL for a news site into the browser, or click a link on a page. The computing device 200 may monitor the navigation events using functionality built into the browser 206, through a browser extension such as a plug-in or toolbar, or via a third party application executing in tandem with the browser.

At stage 504, the computing device 200 increments a frequency value associated with the URL selected at stage 502. For example, the computing device 200 may track a frequency value associated with each URL selected by a user. The frequency value is a data metric used to rank a number of visits to a particular web site or the number of times a particular navigation event is selected. In response to a selection operation, the computing device 200 may increment the frequency value associated with the URL, for example by 1.0, 5.0, 10.0, 0.5, or any other value. The frequency value associated with the URL represents how often the user has selected the particular URL, and thus is an indicator of how likely the user is to select the URL in the future.

At stage 506, the computing device 200 time decays the stored frequency values for the URLs after a given "sweep interval". Decaying the URL frequency values in this manner allows for current browsing habits to be more heavily weighted than previous browsing habits. As an example, the computing device 200 may execute the sweep every 30 seconds, every minute, or every 5 minutes during which the user has selected at least one URL. The sweep interval may be conducted in response to the selection of at least one URL during a particular sweep interval to ensure that the navigation history values are not decayed below a threshold value during periods where the user is inactive. The sweep may decay the stored frequency value associated with the URL by a particular value, such as 0.99, 0.5, or 1.0, or by a percentage value, such as 5%, 10%, or 50%. Once the value associated with the URL drops below a given threshold, for example, 0.3, 1.0, or 5.0, the URL may be removed from the list of possible navigation destinations to avoid the list growing too large. After conducting the decay process, the frequency values for the URLs may be persisted to a local storage on the computing device 200, or sent to a remote storage such as provided by the server 104.

At stage 508, the stored frequency values may be used to determine the relative frequency with which the user visits particular web sites. The frequency value thus provides a basis from which a confidence value associated with a navigation event leading to each web site may be derived. In some aspects, the frequency value itself may be provided as the confidence value. In some aspects, the confidence value is determined by comparing a frequency value for a particular web page with the entire user navigation history. For example, the navigation event with the higher frequency value may be associated with a particular percentage confidence value, the second highest frequency value a lower percentage, and the like. In some aspects, the confidence value is determined by frequency value by the total number of logged navigation events. For example, the frequency value of a particular URL may be divided by the sum of all frequency values to determine a confidence value.

For example, a user may be in the process of buying a home, and thus regularly checking financial and banking websites for mortgage rates. During this time, these financial and banking sites would have high values and thus be more likely to be prerendered, thus improving the user experience while searching for a mortgage rate. After completing the home purchase process, the user is likely to lose interest in day to day rate fluctuations, and thus it is no longer optimal to prerender these websites, since the user is unlikely to visit them. As such, providing for a time decay value allows these sites to fall off of the list over time.

Figure 6:
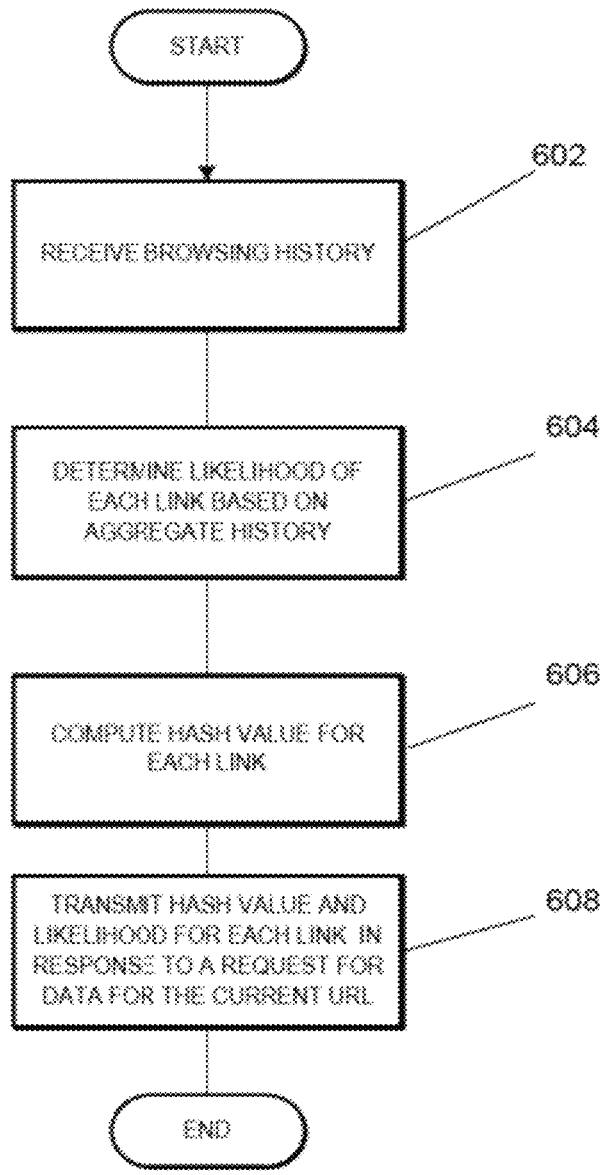
FIG. 6 is a flow diagram depicting an example method for predicting a navigation event based on an aggregate navigation history in accordance with aspects of the disclosure.

FIG. 6 is a flow diagram depicting an example method 600 for predicting a navigation event based on an aggregate navigation history in accordance with aspects of the disclosure. The method 600 is operable to track navigation events voluntarily submitted by users to determine likely navigation patterns. The navigation patterns are then analyzed, such as by a server 104, and supplied to the user to facilitate navigation event prediction during the browsing process. For example, a server, such as the server 104, may send updates to a computing device, such as the computing device 200, as the user browses to different pages, to provide information on which link displayed on a given page is most likely to be selected based on the aggregate navigation history.

At stage 602, the server 104 receives a set of navigation information comprising a browsing history. The browsing history is preferably provided by using an "opt-in/out" method, where the user specifically enables (or disables) reporting functionality to provide elements of their browsing history to the server 104. In addition, personally identifying data can be anonymized and aggregated before it is stored or used, such that no personal information is stored or accessible. A browsing history may be tracked and provided to the server 104 via a browser plug-in or toolbar installed on the user's computing device which tracks the user's browsing history, or by the web browser itself. The browsing history may be combined with other received browsing histories to create a set of aggregate data used in a similar manner as the client navigation history described with respect to FIG. 4, to predict a likely navigation event. The received navigation history may be anonymized to remove any personally identifying information. In some aspects, the received navigation history is received with individual URLs and/or transitional URL pairs provided in a hashed data format to remove any personally identifying information prior to transmission to the server 104.

At stage 604, the server 104 determines a confidence value for each URL on a particular web page, based on the navigation information received at stage 602. For example, the server may employ a method similar to that disclosed above with respect to FIG. 5 for generating confidence values for URLs on a page, except the navigation events are determined based upon aggregated data instead of specific user data. As above, the server 104 may compute confidence values based upon the frequency values derived from the navigation information. In some aspects, confidence values are determined by the percentage of the time that users selected a particular navigation event when they were presented with the choice to select the particular navigation event. The transitional URL pairs provide for the determination of a confidence value by dividing a frequency value of a source/destination URL pair by a total number of appearances of the source URL. In some aspects, the server may determine navigation events based upon transitions from a first page to a second page, rather than from a pure visit frequency metric. The server 104 may maintain an index of web pages and associated URLs and confidence values for each link on the web page, such as in a database. For example, a news site may have five URLs pointing to different news stories. The server 104 may receive aggregate data indicating that one of the five news stories is selected 60% of the time, with the other four being selected 10% of the time each. As such, the server 104 would index the page in a database with a 60% likelihood for the first story link, and 10% likelihoods for each of the other four story links.

In some aspects, the server 104 maintains history data in a confidential manner, such as by converting each URL to a hash value at stage 606. In this manner, the server 104 may provide predicted URL data to a client device without disclosing any personal user data. For example, a user may visit a banking web page that has a particular user name and password login. Depending upon the user, the banking web page may provide URLs to each account the user possesses. Each user accessing the page may have a different set of links provided, depending upon the accounts the user has with the bank. By converting the links on the page to non-reversible hash values, the server 104 may provide confidence values that are not associable to links on the page unless the user also possesses access to the same links (e.g., the client can apply the hash function to links they already possess on the currently viewed page to determine if the confidence values apply). As described above, in some aspects, the hash value is computed by the computing device 200 prior to sending navigation history data to the server 104. In this manner, the server 104 may receive the navigation history data in the hashed format, without the need to compute a hash value.

At stage 608, the server 104 transmits the hash values and confidence values associated with the hash values to a client device, such as the computing device 200. The transmittal may be in response to a request from the computing device 200 for a particular URL. In some aspects, the server 104 may transmit the hash values and confidence values in response to a request for such values from a service executing on the client device 200. For example, when the computing device 200 requests the news web page described above, the server 104 provides the hash values and confidence values for the five story links present on that page. The computing device 200 may also request data for particular link hash values by first generating a hash value on the client side, then requesting a confidence value for the particular hash value from the server 104.

Figure 7:
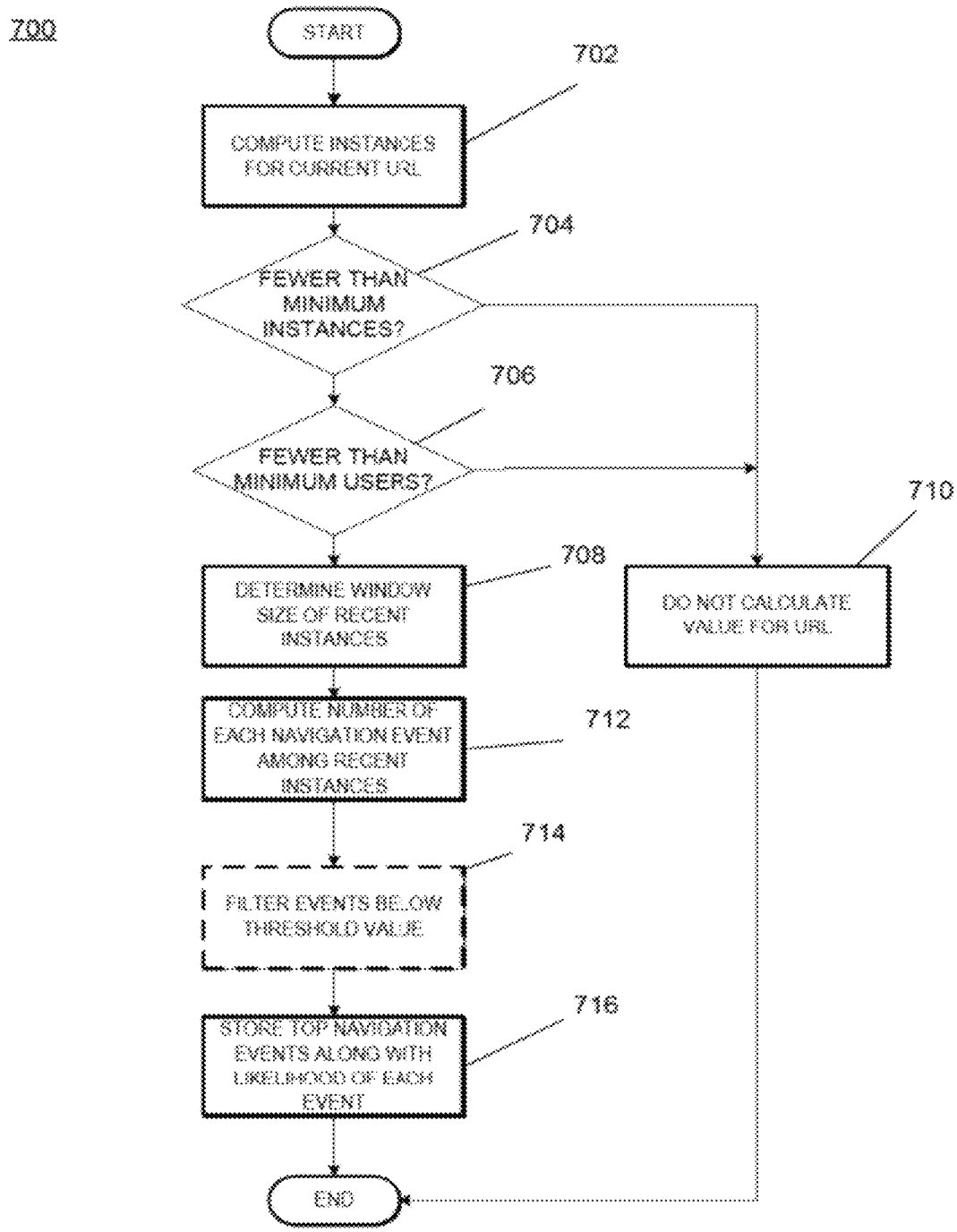
FIG. 7 is a flow diagram depicting an example method for computing a confidence value for a URL using an aggregate navigation history in accordance with aspects of the disclosure.

FIG. 7 is a flow diagram depicting an example method 700 for computing a confidence value for navigation events associated with a URL using an aggregate navigation history in accordance with aspects of the disclosure. The method 700 serves to compare navigation events from a given URL received from a plurality of users, in order to determine how likely each individual navigation event is. The confidence values may be determined in relation to a particular "source" web page, with different confidence values for each URL depending upon the page the user is currently viewing. For example, the confidence values may be used above as described with respect to stage 604 of the method 600 (see FIG. 6).

At stage 702, the server 104 examines received browsing histories and computes a number of instances for each navigation event as associated with a particular URL. As described above, the instance value may be a percentage or a raw number.

At stage 704, the server 104 may determine if the number of visits to the URL exceeds a minimum threshold of statistical significance. For example, five visits to a particular URL may not provide statistically significant data sufficient to reasonably predict a likely navigation event away from the URL. For example, if the number of instances of the event is less than 1000, the server 104 may proceed to stage 710, and not calculate a probability for the event because the sample size is insufficient.

At stage 706, the server 104 may determine if a minimum number of users have submitted data regarding the URL to provide statistically significant data. For example, the method 700 may require that at least 50 users have provided data in order to compute and store a confidence value for the navigation event. Otherwise the method 700 may proceed to stage 710 and disregard the event until a sufficient number of users have provided data. As above, the threshold value may fluctuate depending upon the size of the dataset.

At stage 708, the server 104 determines a window size of recent instances. The window size refers to the number of latest visits to the URL that will be examined to determine the confidence value, or a length of time to search back through the instances. The window size may be determined based on the amount of traffic the URL receives, how often the content of the URL changes. For example, a news website that has constantly changing content might require a small instance window, because links from the regularly changing URL would grow stale. A website with a small amount of traffic would typically require a longer window size in order to gather enough results for statistical significance. The window size might be set at 50 instances, 100 instances, 1000 instances, all instances within the last hour, within the last day, within the last week, or the like.

At stage 712, the server 104 computes the number of times each particular navigation event, such as the next URL visited for the current URL, occurs within the instances defined by the window size determined at stage 710. For example, out of 1000 visits to a news website, a particular article might be selected 600 times, resulting in a confidence value of 60% for navigating to that article from the URL. While the present example primarily relates to determination of a navigation event based upon a number of accesses as a percentage of total navigation events, additional heuristics may also be used to derive the likely event based upon information supplied by the user, such as the previous navigation event (e.g. the website that led to the currently analyzed URL), the time of day (e.g. users are more likely to check news sites when in the morning when they arrive at work), the user's location (e.g. users in a particular geographic region are likely to check sports scores for local teams), or other demographic information.

At stage 714, the server 104 optionally compares the confidence values for the navigations events from the URL with a threshold value. If the confidence values do not meet the threshold value, the server 104 may identify a subset of available navigation events, as possible predicted likely navigation events. In this manner the server 104 avoids predicting navigation events when the event does not have a statistically significant likelihood of occurring, thus potentially saving bandwidth on prerender operations on pages that are unlikely to be visited. The threshold may be set at a variety of different values, such as 5%, 25%, 50%, or 75%. In some aspects, the threshold may be dynamically altered based upon the number of navigation links present at the URL, the type of URL, the traffic of the URL, the speed at which content changes at the URL, and the like. If the confidence values do not meet the minimum threshold, the server 104 may filter out the possible events that do not meet the minimum threshold.

If the navigation event or events meet the minimum threshold, or the method 700 does not check for a minimum threshold, the most likely navigation event or events and the likelihood for each event are stored along with the URL at stage 716. The navigation events and confidence values may be supplied in response to a request to the user, such as occurs at stage 608 described with respect to FIG. 6. The method 700 ends after computing and storing the confidence values for the navigation events associated with the URL.

Figure 8A:
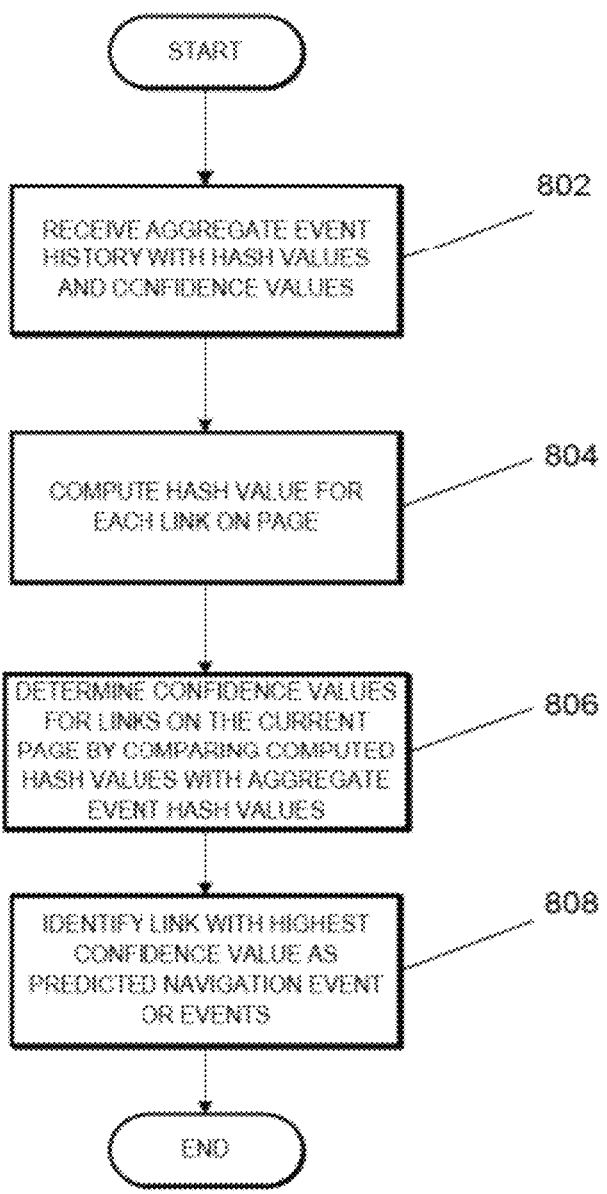
FIG. 8A is a flow diagram depicting an example method for predicting a navigation event based on an aggregate navigation history using hash values to anonymously manage link data in accordance with aspects of the disclosure.

FIG. 8A is a flow diagram depicting an example method 800 for predicting a navigation event based on an aggregate navigation history using hash values to anonymously manage link data in accordance with aspects of the disclosure. The method 800 provides logic by which a computing device 200 may predict a navigation event based upon data received from a server 104, such as the data generated by the method 700 described with respect to FIG. 7.

At stage 802, the computing device 200 receives a set of data from a remote server 104, the set of data comprising information associated with an aggregate browsing history of a web page. This aggregate data may be received in response to a request made by the computing device 200 in response to navigating to a particular web page. The aggregate data may represent a collection of data received by a remote server from a plurality of users. For example, a web browser plug-in may allow the user to "opt-in/out" of functionality that may send their anonymized navigation history to a remote server. The remote server may then collect navigation histories from a plurality of users, stored as an aggregate navigation history, such as described above (see FIG. 7). For example, the navigation prediction module 208 may generate a request to the server 104 every time the user navigates to a web page, for the aggregate browsing data associated with that web page. The navigation prediction module 208 may then predict a likely next navigation event using the received data, so as to supply the prerender module with a next page to prerender to improve the browsing experience.

Due to the data's aggregate nature, it can be provided as a series of hash values to protect individual user information, as described above with respect to FIG. 6. As such, the computing device 200 associates the received hash values and confidence values with the links present on the current URL. To begin this process, at stage 804, the computing device computes a hash value for each link on the current page using the same hash function as used by the server 104 to anonymize the link data. As described above, in some aspects the hash value is computed on the computing device prior to sending navigation history data to the server. In such cases, the hash value would match the original computed value determined by the computing device prior to the navigation event being transmitted to the server, rather than a value computed on the server.

At stage 806, the computing device 200 compares the computed hash values with the received hash values from the server 104. In this manner, the computing device 200 may match the confidence values and hash values received from the server 104 with the links available for the user to select on the currently viewed web page. The confidence values indicate a likelihood that a particular navigation event associated with the hash value will be selected. The computing device 200 may thus map the currently viewable links with the received confidence values.

At stage 808, the computing device 200 identifies the link or links with the highest confidence value or values as the predicted next navigation event. The method 800 ends after predicting the next navigation event.

Figure 8B:
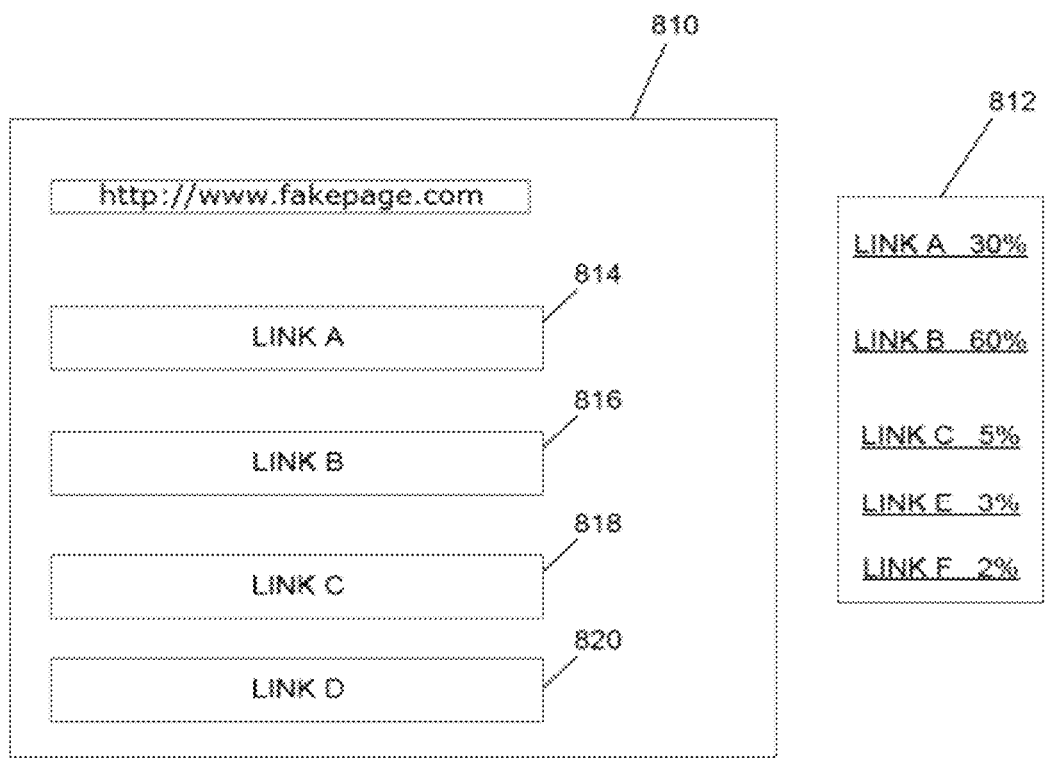
FIG. 8B is an illustration of an example web browser employing an example method for predicting a user navigation event based on an aggregate navigation history in accordance with aspects of the disclosure.

FIG. 8B is an illustration of an example interface 810 of a web browser employing an example method for predicting a user navigation event based on a navigation history in accordance with aspects of the disclosure. The illustration depicts a web browser interface 810 displaying a web site and a set of navigation history data 812. The web page 810 comprises one or more links 814, 816, 818, 820. These links 814, 816, 818, 820 may be URLs that, when selected by a user, direct the web browser to display a set of content associated with the selected link.

The navigation history data 812 comprises data associated with the links 814, 816, 818, and two other links, Link E and Link F that are not present for the current user viewing the page. The navigation history data 812 may represent an analysis of the individual user's navigation history (See FIGS. 4-5), or an aggregate navigation history (See FIGS. 6-8). The navigation history 812 comprises information about the links 814, 816, 818, and a confidence value associated with each link.

The navigation history 812 may be used by other aspects of a computing device 200, such as the navigation prediction module 208, to predict the next navigation event. For example, in the present illustration, according to the navigation history 812, there is a 30% chance the user will select Link A 814, a 60% chance the user will select Link B 816, and a 5% chance the user will select Link C 818. Link D 820 does not have any associated data stored in the navigation history 812. The lack of data for Link D 820 may be explained in a variety of manners, such as that the chance of selection of Link D 820 is below a threshold value, or that no data has been submitted for Link D 820. The navigation history 812 also displays a non-zero chance of selecting two links that are not present, Link E and Link F. These links may have been removed from the web page in an update, or they may not be visible to all users, such as the user currently accessing the page. In accordance with aspects of the disclosure, the navigation prediction module 208 identifies Link B 814 as a predicted next navigation event because the confidence value of Link B 814 is greater than the values for Link A 812 and Link C 818.

Figure 9A:
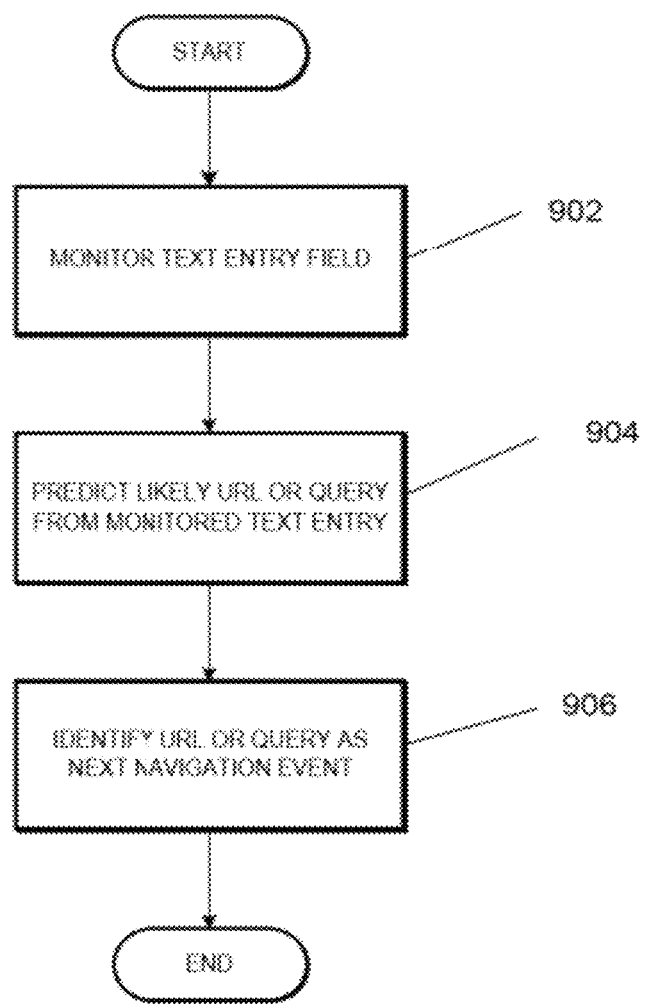
FIG. 9A is a flow diagram depicting an example method for predicting a navigation event based on data entered within a text field in accordance with aspects of the disclosure.

FIG. 9A is a flow diagram depicting an example method 900 for predicting a navigation event based on data entered within a text field in accordance with aspects of the disclosure. The method 900, when executed by a client device such as the computing device 200, is operable to predict a next navigation event based upon text entry. The client device 200 may then predict the next likely navigation event by comparing the entered text with a set of historical navigation data.

At stage 902, the computing device 200 monitors entry within a text field, such as a URL navigation bar in a web browser, or a query entry field on a search engine page. The text entry may comprise a destination, such as a typed URL, a search query to be submitted to a search engine, or other data entered within a web form.

At stage 904, the computing device 200 predicts a navigation event based upon the entered text. For example, the computing device 200 may compare the entered text with a user browsing history. As the user enters text, the computing device 200 may search the user browsing history to compare the partially entered text with previously visited web pages. For example, the user may enter "www.goo" and the computing device 200 may predict that the user has begun typing "www.google.com" based upon the user's past visits to www.google.com. In another aspect, the user may enter a partial query into a search engine query entry field. As the user enters the query, the browser may begin prerendering a results page for the most likely queries associated with the text that the user has entered.

At stage 906, the navigation events as identified at stage 906 are provided as the predicted navigation events to be used elsewhere, such as provided by the navigation prediction module 208 and used by the prerender module 210 to prerender the predicted content.

Figure 9B:
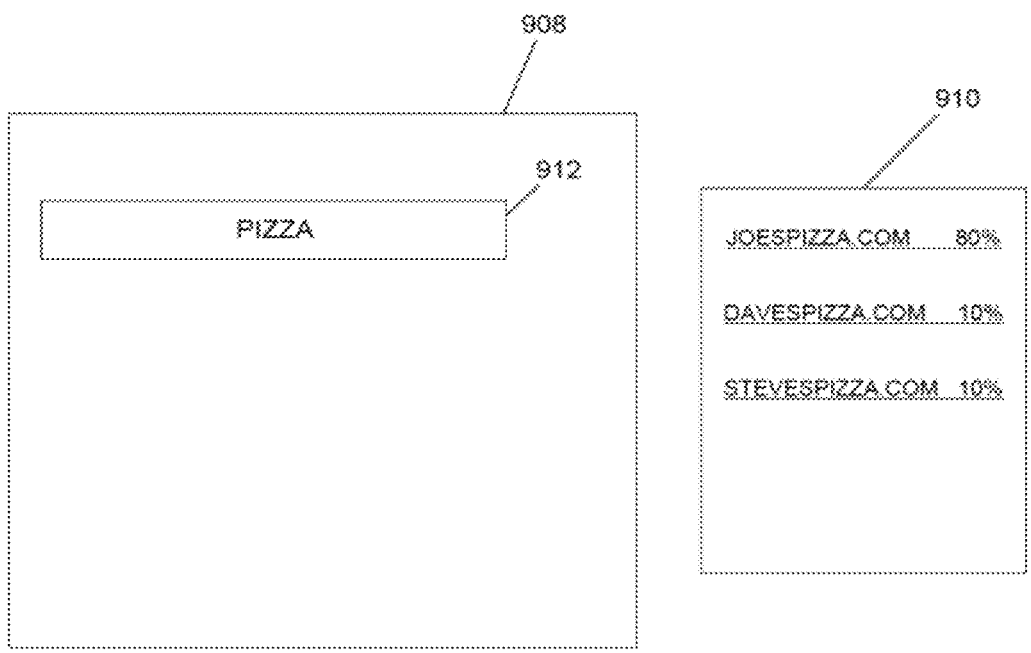
FIG. 9B is an illustration of an example web browser employing an example method for predicting a user navigation event based on data entered within a text field in accordance with aspects of the disclosure.

FIG. 9B is an illustration of an example web browser interface 908 employing an example method for predicting a user navigation event based on data entered within a text field in accordance with aspects of the disclosure. The illustration depicts a web browser interface 908 and a set of links associated with confidence values 910. For example, a web browser associated with the web browser interface 908 may execute on the computing device 200 as described above. The web browser interface 908 comprises a text entry field 912. In some aspects, the text entry field 912 is an address bar for entering a URL. In some aspects, the text entry field 912 may be part of a web page, such as a search string entry field on a search engine web site.

As the user enters text within the text entry field 912, the computing device 200 determines a most likely destination from the entered text. For example, the user may enter the word "Pizza" in the text entry field 912. Based upon the user's intent to navigate to a page related to Pizza, the system determines there is an 80% chance the user wishes to navigate to "joespizza.com", and a 10% chance to navigate to each of "davespizza.com" or "stevespizza.com". The percentage values for each link may be determined by a variety of data analysis methods, taking into account factors such as the user's navigation history, an aggregate navigation history, sponsorship from various result web pages, and the like. In the previous example, "joespizza.com" would be identified as the predicted navigation event based upon the fact that it is associated with the highest percentage.

Figure 10A:
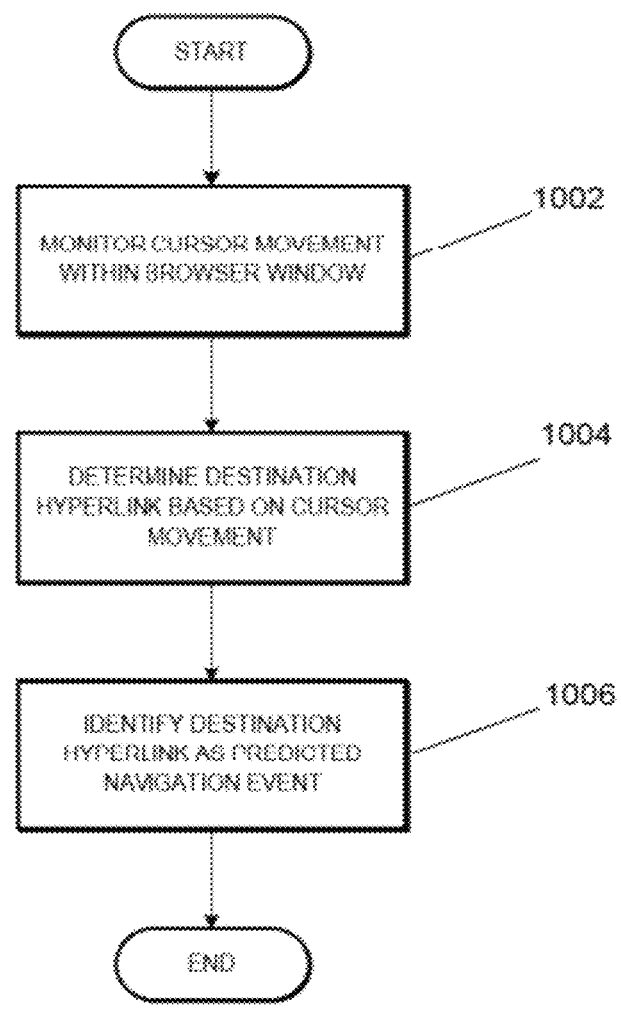
FIG. 10A is a flow diagram depicting an example method for predicting a navigation event based on mouse cursor movement in accordance with aspects of the disclosure.

FIG. 10A is a flow diagram depicting an example method 1000 for predicting a navigation event based on mouse cursor movement in accordance with aspects of the disclosure. The method 1000 allows a computing device, such as the computing device 200, to predict a navigation event by the position of a mouse cursor on a screen. Similar concepts might also be applicable to other forms of user input, such as TRACK-IR, keyboard inputs, light pens, trackballs, or any other input device capable of manipulating a cursor.

At stage 1002, the computing device 200 monitors cursor movement. For example, the computing device 200 may monitor a mouse cursor as a user browses and scrolls through a web page. The computing device 200 may track the location, speed, and acceleration of the cursor on the page.

At stage 1004, the computing device 200 predicts a likely navigation event from the cursor movement as monitored at stage 1002. The navigation event may be predicted by identifying the link closest to the cursor, by extrapolating the cursor position based on the cursor's direction of movement, by determining a speed and direction and most likely destination of the cursor, by identifying a link under the cursor, or the like. Aspects of the disclosure may select multiple links or navigation events for prediction in the event the extrapolated position of the cursor passes through multiple links. The computing device 200 may also select multiple links within a certain distance of the cursor, and in some aspects may decrease a value for links from which the cursor is moving away. After predicting one or more next navigation events based on cursor movement, the method 1000 ends.

Figure 10B:
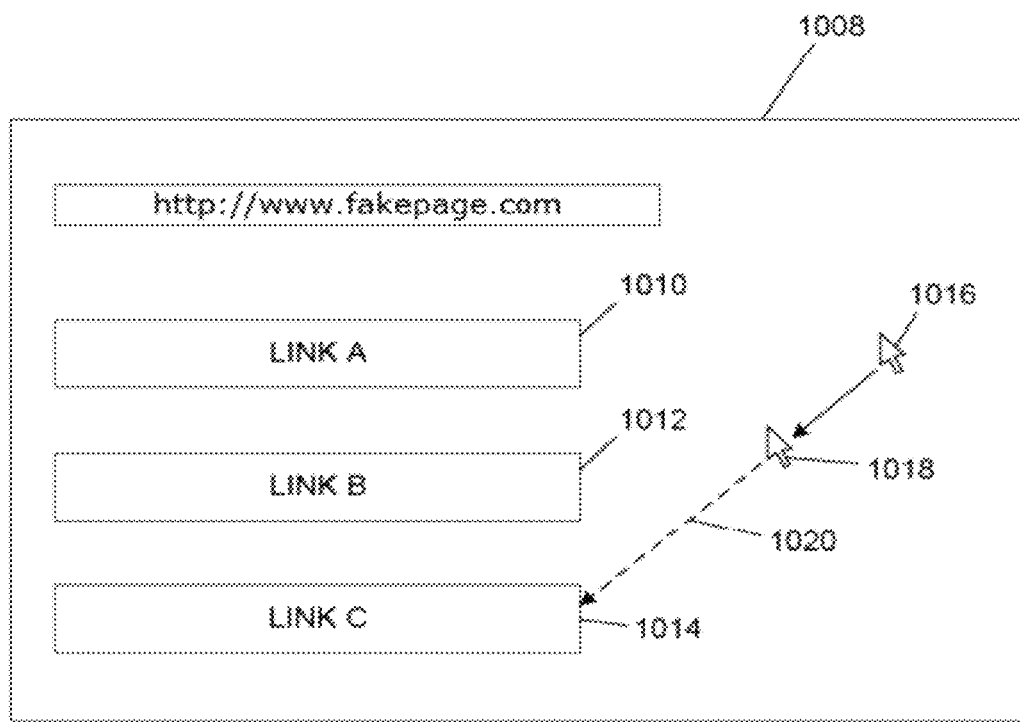
FIG. 10B is an illustration of an example web browser employing an example method for predicting a user navigation event based on a mouse cursor movement in accordance with aspects of the disclosure.

FIG. 10B is an illustration of an example web browser interface 1008 of employing an example method for predicting a user navigation event based on a mouse cursor movement in accordance with aspects of the disclosure. The illustration comprises a web browser interface 1008 displaying a web page comprising three links 1010, 1012, 1014 and a cursor. The cursor has an initial position 1016, and then moves to a second position 1018. The two positions 1016 and 1018 are used to determine a line 1020 indicating the likely future position of the cursor. The likely next navigation event is predicted by extending the line 1020 to determine which of the three links is intersected, or nearly intersected. In the present example, the line 1020 intersects with Link C 1014, or comes very close to it. As such, Link C 1014 is identified as a predicted navigation event.

The stages of the illustrated methods described above are not intended to be limiting. The functionality of the methods may exist in a fewer or greater number of stages than what is shown and, even with the depicted methods, the particular order of events may be different from what is shown in the figures.

The systems and methods described above advantageously provide for an improved browsing experience. By predicting the next navigation event, the browser can perform prerender operations to minimize the amount of time users wait for web pages to load. Multiple methods to perform the prerender operations provide a flexible and robust system for determining the next navigation event.

As these and other variations and combinations of the features discussed above can be utilized without departing from the disclosure as defined by the claims, the foregoing description of the embodiments should be taken by way of illustration rather than by way of limitation of the disclosure as defined by the claims. It will also be understood that the provision of examples of the disclosure (as well as clauses phrased as "such as," "e.g.", "including" and the like) should not be interpreted as limiting the disclosure to the specific examples; rather, the examples are intended to illustrate only some of many possible embodiments.

The invention claimed is:

1. A computer-implemented method for predicting a navigation event, the method comprising:
 tracking a navigation history;
 calculating one or more confidence values for one or more of a plurality of navigation events using the navigation history, wherein calculating the one or more confidence values comprises:
  monitoring for the selection of a first uniform resource locator;
  incrementing, in response to the selection, a frequency value associated with the first uniform resource locator or a frequency value associated with a pair of uniform resource locators, the pair comprising the first uniform resource locator and a source uniform resource locator;
  decaying a different frequency value for non-selected uniform resource locators after a predetermined time interval;
  storing the frequency value in a memory; and
  determining a confidence value for the uniform resource locator or pair of uniform resource locators from at least one frequency value stored in the memory;
 determining, using a processor, one or more likely navigation events using the confidence values; and
 identifying at least one of the one or more likely navigation events as a predicted navigation event.

2. The method of claim 1, further comprising retrieving content associated with the predicted navigation event.

3. The method of claim 1, wherein the decaying of the frequency value for the non-selected uniform resource locators is performed in response to the selection of the first uniform resource locator.

4. The method of claim 1, wherein the navigation history is associated with at least one of a particular client or a particular user.

5. The method of claim 1, wherein the navigation history is associated with a plurality of users.

6. The method of claim 5, further comprising:
 computing a first hash value for a navigation event associated with a first uniform resource locator or a transitional pair of uniform resource locators, wherein the transitional pair comprises a source uniform resource locator and a destination uniform resource locator;
 computing a confidence value for the navigation event; and
 transmitting the hash value and the confidence value, such that a receiver of the first hash value and the confidence value computes a second hash value of a second uniform resource locator to identify the first uniform resource locator to which the confidence value applies.

7. The method of claim 5, wherein determining the most likely navigation event comprises:
 for at least one uniform resource locator (URL), computing a most visited subsequent URL based on the navigation history of the plurality of users.

8. The method of claim 7, further comprising determining if the number of visits to the subsequent uniform resource locator is greater than a threshold number of visits.

9. The method of claim 7, further comprising determining if a number of users submitting data for the subsequent uniform resource locator is greater than a threshold number of users.

10. The method of claim 7, further comprising:
 identifying a window of recent visits to be analyzed to determine the most visited subsequent URL; and
 analyzing visits within the identified window.

11. The method of claim 10, wherein the window is specified by a time period or a number of visits.

12. The method of claim 1, wherein the navigation history comprises at least one of a uniform resource locator or a transitional pair of uniform resource locators, wherein the transitional pair of uniform resource locators comprises a source uniform resource locator and a destination uniform resource locator.

13. A computer-implemented method of predicting a next navigation event, the method comprising:
 receiving a set of data for a uniform resource locator, the set of data comprising hash values associated with one or more links associated with the uniform resource locator and a set of confidence values associated with the one or more links, wherein calculating the set confidence values comprises:
  monitoring for the selection of a first uniform resource locator;
  incrementing, in response to the selection, a frequency value associated with the first uniform resource locator or a frequency value associated with a pair of uniform resource locators, the pair comprising the first uniform resource locator and a source uniform resource locator;
  decaying a different frequency value for non-selected uniform resource locators after a predetermined time interval;
  storing the frequency value in a memory; and
  determining a confidence value for the uniform resource locator or pair of uniform resource locators from at least one frequency value stored in the memory;
 computing, using a processor, a hash value for one or more links present on a page associated with the uniform resource locator;
 comparing the computed hash values with the received hash values to map each computed hash value to a received hash value; and
 identifying the confidence value associated with each visible link based upon the received confidence value associated with the received hash value to which the computed hash value for the link maps.

14. The method of claim 13, further comprising predicting one or more next navigation events, where the one or more predicted next navigation events relate to a link with the highest identified confidence value.

15. A processing system for predicting a next navigation event comprising:
- at least one processor;
- a navigation prediction module associated with the at least one processor; and
- memory for storing navigation data, the memory coupled to the at least one processor;
- wherein the navigation prediction module is configured to calculate one or more confidence values for one or more of a plurality of navigation events using the navigation data, to determine one or more likely navigation events using the confidence values, and to identify at least one of the one or more likely navigation events as a predicted navigation event,
- wherein to calculate the one or more confidence values the navigation prediction module is further configured to monitor for the selection of a first uniform resource locator, increment, in response to the selection, a frequency value associated with the first uniform resource locator or a frequency value associated with a pair of uniform resource locators, the pair comprising the first uniform resource locator and a source uniform resource locator, decay a different frequency value for non-selected uniform resource locators after a predetermined time interval, store the frequency value in a memory, and determine a confidence value for the uniform resource locator or pair of uniform resource locators from at least one frequency value stored in the memory.

16. The system of claim 15, wherein the navigation data comprises at least one of a browsing history, a text entry, or a cursor input.

* * * * *